Oct. 15, 1968　　　　　P. J. NEELY　　　　　3,405,963

FISH-HOLDING TOOL

Filed Nov. 14, 1966

Palace J. Neely
INVENTOR.

BY
Browning, Simms, Dyer & Eichenrodt
ATTORNEYS

United States Patent Office 3,405,963
Patented Oct. 15, 1968

3,405,963
FISH-HOLDING TOOL
Palace J. Neely, 239 Styers St.,
Houston, Tex. 77022
Filed Nov. 14, 1966, Ser. No. 594,124
5 Claims. (Cl. 294—16)

This invention relates to devices for holding fish, while they are being cleaned.

Fish are hard to hold securely with one hand while they are being cleaned with the other hand. This is particularly true during the descaling operation, which requires considerable force to be exerted lengthwise of the fish. Also, there is the danger of the holding hand being cut should the cleaning knife slip particularly, during the portions of the cleaning operations that the knife is working close to the part of the fish gripped by the holding hand.

It is an object of this invention to provide a simply constructed and easily manipulated device for securely gripping fish of different sizes and shapes to allow them to be firmly held while being cleaned.

The fish-holding tool of this invention is located in holding position by inserting the tool into the fish's mouth. Preferably, the tool is inserted deep enough into the fish to enter its gullet. The mouth of most fish will open very wide; their gullet, however, is of relatively fixed diameter. Portions of the tool are provided with rough surfaces to engage the inside of the mouth or gullet of the fish and hold the tool in place. These surfaces, if rough enough to function as desired, will tend to hang up on the inside of the fish, as the tool is inserted, making it difficult to get the tool into the fish as far as desired. Further, after the fish has been cleaned, these rough surfaces will make it difficult to remove the tool into and removed from a fish's mouth.

Therefore, it is another object of this invention to provide such a fish-holding tool that can be easily inserted into and removed from fish's mouth.

It is yet another object of this invention to provide a fish-holding tool having fish holding members that, when in fish-holding position, conforms to the inside of the fish, being narrow enough at one end to extend into and firmly engage the gullet of the fish, yet wide enough at the other end to substantially spread the fish's mouth.

It is another object of this invention to provide a fish-holding tool that extends well into the fish and helps hold the fish straight while it is being cleaned.

It is a further object of this invention to provide a fish-holding tool that can be manipulated with one hand thereby freeing the other hand to clean the fish.

These and other objects, advantages, and features of this invention will be apparent to those skilled in the art from a consideration of this specification, attached drawings, and appended claims.

The preferred embodiment of the fish-holding tool will now be described in connection with the attached drawings, in which.

The tool comprises two elongated fish engaging members, 10 and 11. The members have longitudinally extending edge surfaces 10a and 11a, respectively, which are substantially smooth. Their oppositely facing, longitudinally extending edge surfaces, 10b and 11b, however, are rough. These are the edges intended to engage the fish inside its gullet and hold the fish against movement relative to the members. Therefore, edges 10b and 11b should be rough enough so as to anchor the members when forced against the inside of the fish's gullet. In the embodiment shown, edges 10b and 11b are serrated along most of their length.

Figure 1:
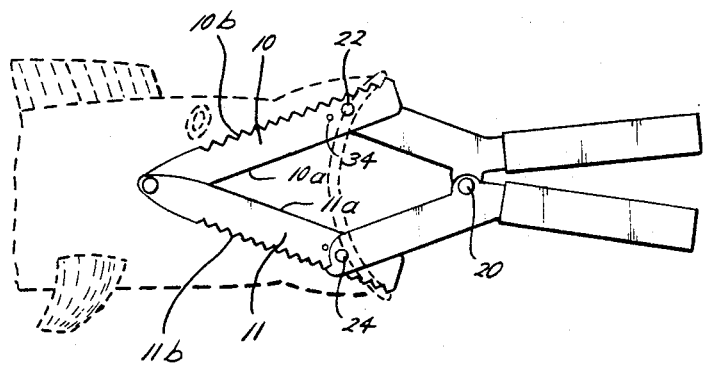
FIGURE 1 is a top plan view of the tool in fish-holding position extended well into the gullet of the fish shown in dotted lines.
Figure 2:
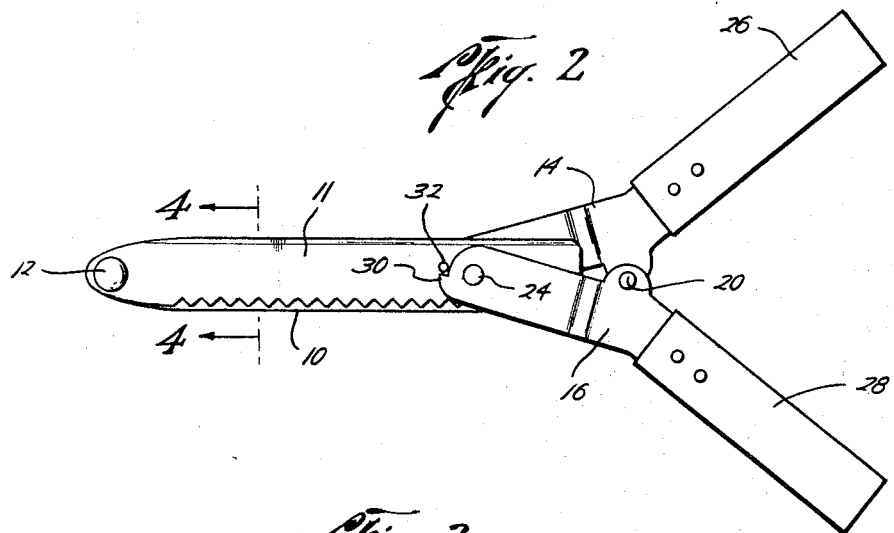
FIGURE 2 is a top plan view of the tool, on an enlarged scale, in position to be inserted into or withdrawn from the mouth of a fish.

Means are provided for connecting the elongated members for pivotal movement between the parallel, side-by-side position, shown in FIGURE 2, and the position of FIGURE 1 with the member pivoted apart and the serrated edges in engagement with the fish's mouth. In the embodiment shown, rivet 12 extends through holes (not shown) in the outer ends of members 10 and 11 to connect the members for pivotal movement between the positions described above. The outer ends of the members adjacent rivet 12 are tapered and beveled to allow end first insertion of the members through the fish's mouth and as deep into its gullet as possible.

Figure 4:
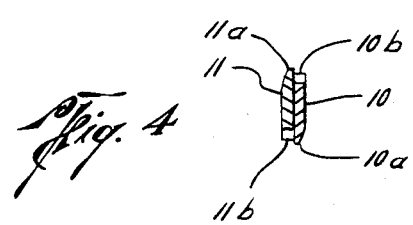
FIGURE 4 is a cross sectional view taken along line 4—4 of FIGURE 2.

Rivet 12 is located so that when the members are in the position shown in FIGURE 2, with their longitudinal edge surfaces substantially parallel, the smooth edge surface of each member will extend laterally beyond the rough, serrated edge surface of the other member. This is shown in FIGURE 4. Thus, when the members are in the position shown in FIGURE 2, they can be inserted into or withdrawn from inside a fish and the overlap of the smooth edges will keep the serrated edges from hanging up on the internal ridges and protrusions of the fish.

Once in position in the fish, preferably, with the members extending into the fish's gullet as far as possible, actuating means are provided, preferably operable with one hand, for moving the members from the inserting position of FIGURE 2 to the holding position of FIGURE 1. In the embodiment shown, two complementary actuating members 14 and 16 are provided. They are connected intermediate their ends by rivet 20 for pivotal movement around a common axis, the longitudinal axis of rivet 20. One end of each member is pivotally connected to one of the fish engaging members. Thus, actuating member 14 has one end pivotally connected to fish engaging member 10 by rivet 22. Rivet 24 pivotally connects fish-engaging member 11 to the end of actuating member 16. The ends of the actuating members are connected to the fish-engaging members at a point spaced from the ends of the members that are pivotally connected together by rivet 12.

The free ends of actuating members 14 and 16 include handles 26 and 28, respectively. The handles diverge away from each other in a direction away from the fish-engaging members, when the fish-engaging members are in the insertion position of FIGURE 2. Thus, by moving the handles toward each other, the ends of the fish-engaging members that are connected to the actuating members will be moved apart and the serrated edges will move into engagement with the inside of the gullet or mouth of the fish. The serrated edges will anchor the tool in the fish and hold it against withdrawal therefrom or further entrance therein. By having the members pivotally connected at the ends that are deepest in the fish, the members will conform to the shape of the inside of the fish, i.e., wide apart to engage the mouth and less wide in the gullet. This results in most of the serrated edges of the members usually being in holding engagement with the fish, particularly when used on large mouth fish.

The handles of the tool can be held in one hand, as shown in FIGURE 1, freeing the other hand to clean the fish.

How far the tool is inserted into the fish's mouth and how far the members are forced apart, when inside the fish, is determined by the size of the fish. By properly positioning the tool, it can be used to hold fish that vary in size considerably.

Figure 3:
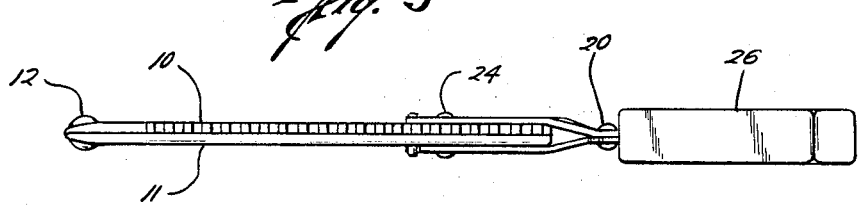
FIGURE 3 is a side view of the tool of FIGURE 2.

Means are provided for limiting the distance the fish-engaging members can be rotated from their insertion position. In the embodiment shown, handles 26 and 28 are coplanar (FIGURE 3) so that they have engaging surfaces, which will limit the distance the fish-engaging members can be moved from the FIGURE 2 position.

Means are also provided to limit the distance the free ends of the actuating members can be moved apart and to stop the fish-engaging members, as they move together, in position for insertion into the fish's mouth. In the embodiment shown, the ends of the actuating members are each provided with an outwardly extending projection, only projection 30 on actuating member 16 being shown in the drawings. It is understood that a similar extension is provided on actuating member 14. Stop pin 32 is fixed to fish-engaging member 11 to engage protrusion 30 and limit the distance actuating handle 16 can be rotated around rivet 20 in a clockwise direction as viewed in FIGURE 2. In the same manner, the protrusion on actuating member 14 engages pin 34, one end of which can be seen in FIGURE 1, to stop the counterclockwise movement of actuating member 14, as viewed in FIGURE 2. As stated above the pins and protrusions are arranged to engage when the actuating members are in position for insertion in a fish's mouth, as shown in FIGURE 2.

From the foregoing, it will be seen that this invention is one well adapted to attain all of the ends and objects hereinabove set forth, together with other advantages which are obvious and which are inherent to the apparatus and structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

I claim:

1. A fish-holding tool comprising, two elongated fish-engaging members each having a longitudinally extending edge surface that is rough along at least a portion of its length, means connecting the elongated members adjacent one end thereof for pivotal movement of the members between a parallel, side-by-side position for insertion of the pivotally connected ends into a fish through its mouth with the rough edges of the members facing in opposite directions and a holding position with the members pivoted apart and the rough edges in engagement with the inside of a fish to anchor the members in the fish, and actuating means, operable with one hand, connected to the members for moving the members between the two positions and for holding the members anchored in the fish, said actuating means including two actuating members pivotally connected intermediate their ends for pivotal movement around a common axis, each member having one free end and one end pivotally connected to one of the fish-engaging members at a point spaced from the pivotally connected ends of the members whereby pivotal movement of the free ends in opposite directions around said common axis will pivot the fish-engaging members around their common pivotal axis between said insertion and holding positions.

2. The fish-holding tool of claim 1 in which the portion of the actuating members between the free ends and the common pivotal axis diverge from the common pivotal axis of the members away from the fish-engaging members when the fish-engaging members are in position for insertion into a fish's mouth.

3. The fish-holding tool of claim 2 in which the diverging free end portions have engaging surfaces to limit the angle through which the fish-engaging members can be rotated from the position for insertion into the fish's mouth.

4. The fish-holding tool of claim 3 further provided with means for stopping the movement apart of the free end portions when the fish-engaging members are in a position to be inserted into a fish's mouth.

5. A tool for holding fish for cleaning, comprising a pair of elongated fish-engaging members, each having a flat side, a rounded end, a first longitudinally extending substantially smooth edge surface, and a second longitudinally extending edge surface facing away from the first that is serrated for substantially its entire length, means connecting the members adjacent their rounded ends with their flat sides facing and their serrated edge surfaces facing in opposite directions for pivotal movement around an axis perpendicular to that flat side between a position with the substantially smooth side surface of each member extending beyond the serrated side surface of the other member to keep the serrated edge surfaces from hanging up on the inside of a fish as the rounded ends of the members are inserted through its mouth and into its gullet and a position with the members pivoted apart to force the serrated edge surfaces into engagement with the fish's gullet to anchor the members therein, and means, operable with one hand, for moving the members between said insertion and holding positions including two actuating members, pivotally connected intermediate their ends for pivotal movement around a common axis, each member having one free end and one end pivotally connected to one of the fish-engaging members at a point spaced from the pivotally connected ends of the members whereby pivotal movement of the free ends in opposite directions around said common axis will pivot the fish-engaging members around their common pivotal axis between said insertion and holding positions.

References Cited

UNITED STATES PATENTS 1,240,610   9/1917   Sheridan _____ 294—97

EVON C. BLUNK, *Primary Examiner.*

H. C. HORNSBY, *Assistant Examiner.*